United States Patent [19]

Ettinger

[11] 4,284,870
[45] Aug. 18, 1981

[54] STUD WELDING WITH FLUID SHIELD

[75] Inventor: Donald H. Ettinger, Royal Oak, Mich.

[73] Assignee: USM Corporation, Farmington, Conn.

[21] Appl. No.: 907,393

[22] Filed: May 18, 1978

[51] Int. Cl.³ .............................................. B23K 9/20
[52] U.S. Cl. ...................................... 219/99; 219/98; 219/127; 228/201
[58] Field of Search ........................... 219/98, 99, 127; 228/118, 201, 202; 427/156; 239/289; 148/9 R, 9 C, 9.5; 266/48, 49

[56] References Cited

U.S. PATENT DOCUMENTS

| 2,250,940 | 7/1941 | Zahn et al. | 228/118 X |
|---|---|---|---|
| 2,446,922 | 8/1948 | Grundner | 427/156 |
| 2,790,066 | 4/1957 | Haynes et al. | 219/98 |
| 2,845,524 | 7/1958 | Morley, Jr. et al. | 219/127 X |
| 3,096,429 | 7/1963 | Mowry et al. | 219/98 |
| 3,123,240 | 5/1964 | McCartney | 219/127 |
| 3,493,717 | 2/1970 | Sciaky | 219/127 |
| 3,855,011 | 12/1974 | Van Horn | 148/9 R |
| 3,934,818 | 1/1976 | Arnold | 148/9 R X |
| 4,160,148 | 7/1979 | Jenkins | 219/98 |

Primary Examiner—Gene Z. Rubinson
Assistant Examiner—Keith E. George
Attorney, Agent, or Firm—Aubrey C. Brine

[57] ABSTRACT

Method and apparatus are provided for welding studs to a work surface wherein a substantially smut free surface is produced adjacent the weld. Apparatus is provided for depositing a thin coating of liquid in spray form onto the work surface adjacent the area whereon the stud is to be welded, prior to the welding operation. Contaminates formed in suspension in the liquid during the welding operation are removed by removal of the liquid suspension which is accomplished in a simple and inexpensive manner.

18 Claims, 5 Drawing Figures

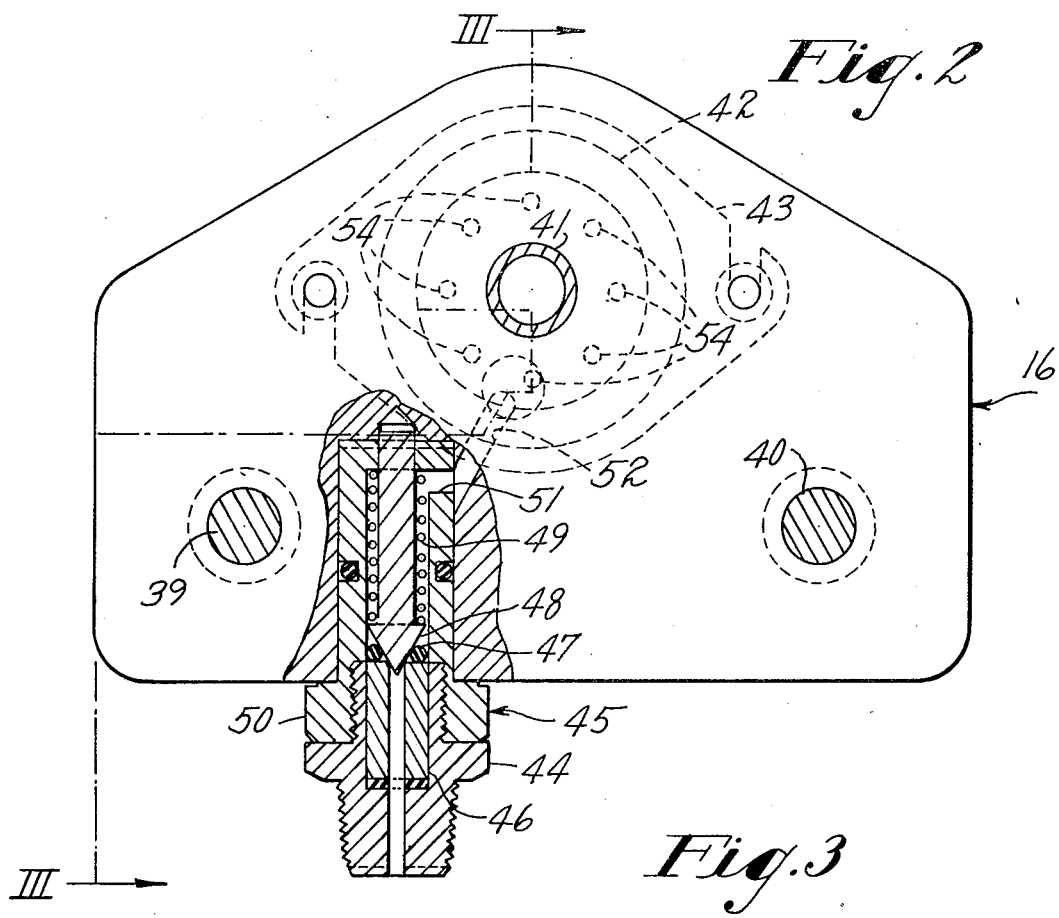
Fig.2
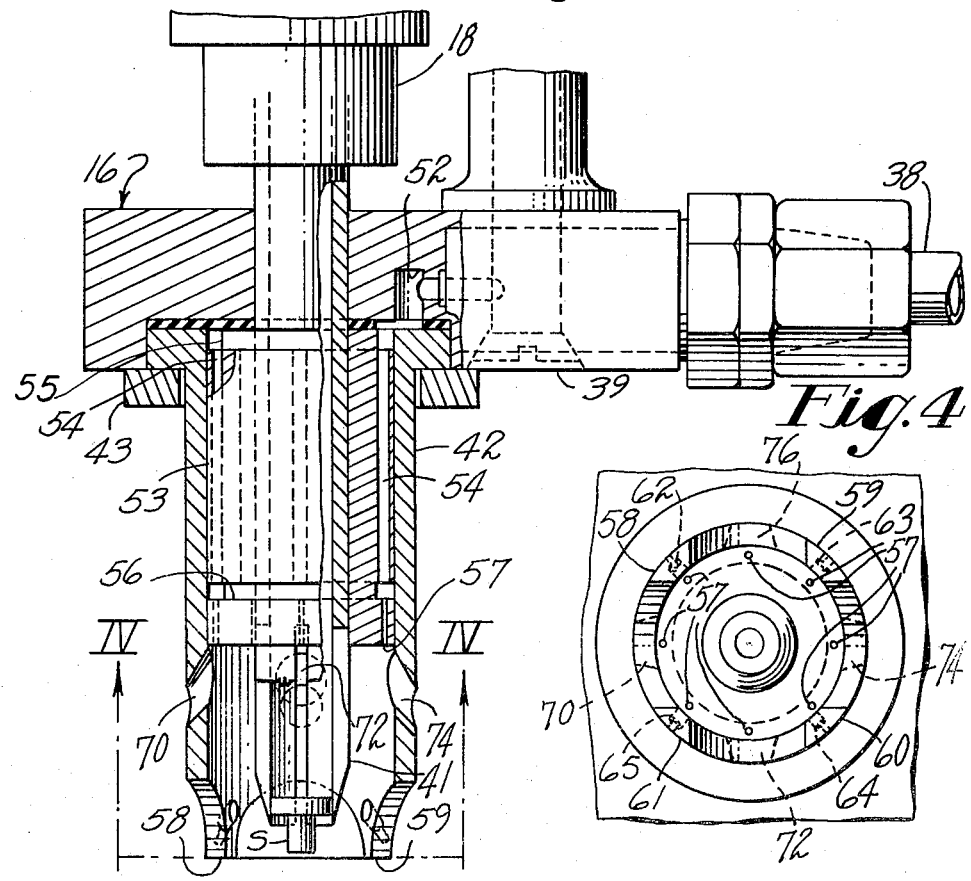
Fig.3
Fig.4

STUD WELDING WITH FLUID SHIELD

BACKGROUND OF THE INVENTION

One of the major problems encountered in automotive assembly as well as other sheet metal assemblies which are subjected to weather and climate conditions is that of corrosion. It has been found that in automotive assembly, corrosion around a stud welding zone quite often occurs due to the ring of black or grey contaminate often called "smut" which is deposited on the surface of the metal around the stud welding zone during the welding operation. This contaminate prevents proper treatment of the metal prior to painting, and as a result when paint is applied over the improperly treated metal, bonding of the paint to the metal does not occur. When this happens, the paint will eventually crack and peel from the surface and rust and corrosion will appear in the area resulting in loss of integrity of the part.

It is therefore, an object of the present invention to provide apparatus for arc welding a metallic article, such as a stud or the like, to a work surface which facilitates removal of contaminates from the work surface adjacent the welded article.

It is a further object of the invention to provide a method of arc welding a metallic article, such as a stud or the like, to a work surface which substantially removes contaminates from the work surface area adjacent the welded article.

SUMMARY OF THE INVENTION

The above objects and other objectives which will become apparent as the description proceeds are achieved by providing apparatus for arc welding a metallic article, such as a stud or the like, to a work surface comprising means for gripping the metallic article and means for connecting the apparatus to a power source for providing a welding arc between the article disposed in the article gripping means and the work surface. Means is disposed adjacent the article gripping means for spraying a liquid in atomized form to provide a thin film of liquid on the area of the work surface surrounding the article, with the article contacting the work and retained in the article gripping means.

In one form, the apparatus is provided with a device for spraying a liquid in atomized form to provide a thin film of liquid in the area of the work surface surrounding the article with the article contacting the work surface which comprises structure forming a spray surface substantially at right angles with the centerline of the article retained in the gripping device. A plurality of conduits are formed in the spray structure and open at the surface. Means is included for providing liquid under pressure to the plurality of conduits.

The invention provides a method of arc welding metallic articles such as a stud, or the like, to a work surface which comprises the steps of spraying a liquid in atomized form to provide a thin film of liquid in the area of the work surface surrounding the article, with the article contacting the work surface. An arc is provided between the article and the work surface to form a weld between the article and surface, and the film of liquid is removed from the work surface to thereby remove contamination produced during the welding operation, in suspension with the liquid.

BRIEF DESCRIPTION OF THE DRAWING

The foregoing and other features of the invention, together with novel details in constructions and combination of parts, will now be more particularly described in connection with an illustrative embodiment, and with reference to the accompanying drawing, wherein:

FIG. 2 is a bottom plan view taken along the line II—II of FIG. 1, partially in section and rotated through ninety degrees and taken on an enlarged scale for clarity of detail;

FIG. 3 is a sectional elevational view taken along the lines III—III of FIG. 2 showing a portion of the structure of FIGS. 1 and 2;

FIG. 4 is a bottom plan view taken along the lines IV—IV of FIG. 3 showing details of a portion of the structure.

DESCRIPTION OF THE PREFERRED EMBODIMENT

Figure 1:
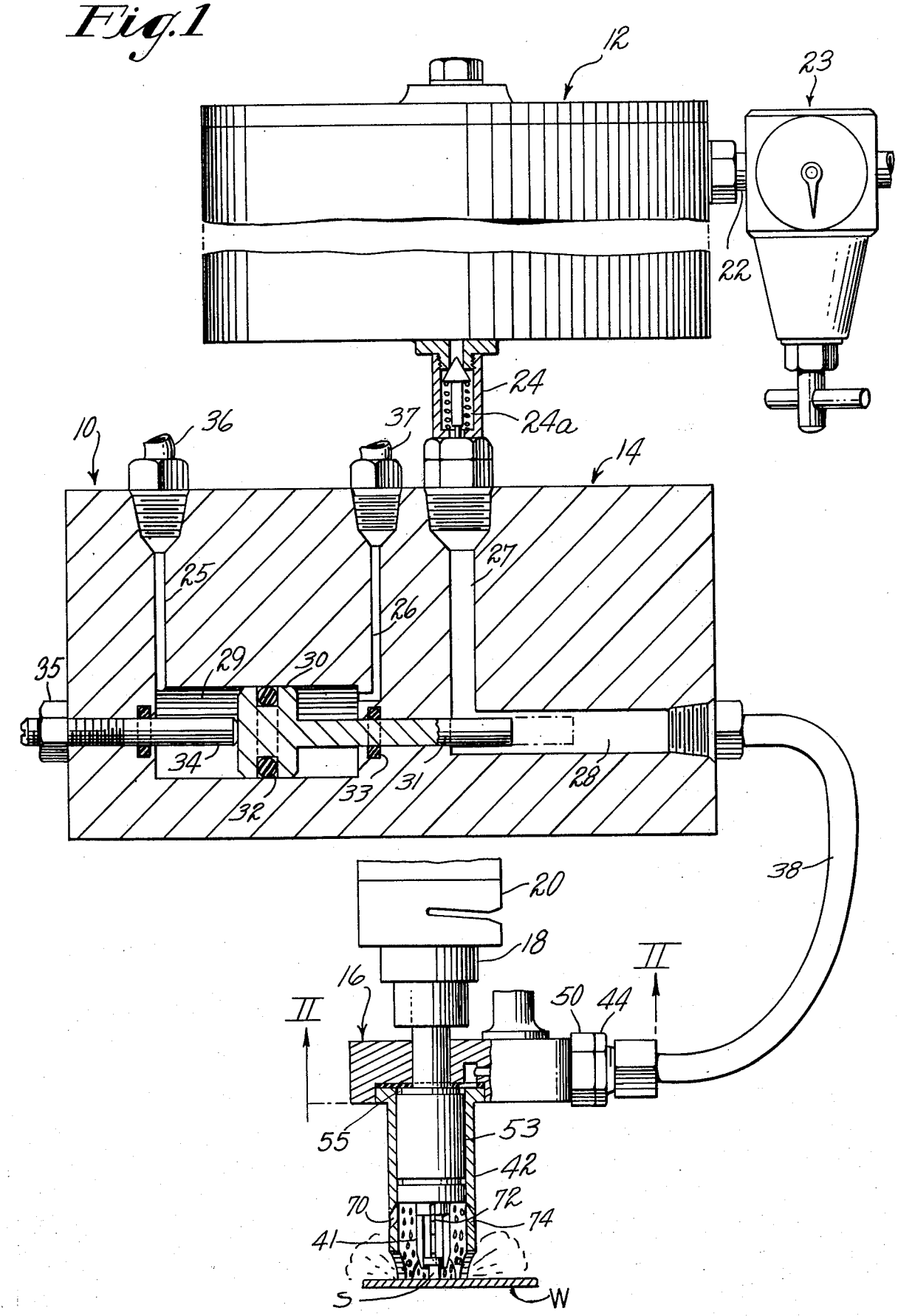
FIG. 1 is an elevational view partially in section showing details of construction of a welding gun constructed in accordance with the teachings of the present invention.

Referring to FIG. 1, there is shown apparatus 10 for welding metal studs to a workpiece W constructed in accordance with the teachings of the present invention. The apparatus 10 includes a liquid reservoir 12, a pressure housing 14, and a spraying device 16 disposed adjacent the nozzle 18 of a welding gun 20. The welding gun 20 which has not been shown in detail, is the type employed for welding metal studs to a workpiece and details of its construction may be similar to that described in U.S. Pat. No. 3,597,572 issued to Donald H. Ettinger et al, and assigned to the assignee of the present invention.

The liquid reservoir 12 is provided with a pressure line 22 leading to a source of air pressure (not shown). A bypass valve 23 is connected into the line 22 and is adjustable to maintain a predetermined pressure within the reservoir 12. The pressure housing 14 is connected to the reservoir 12 by a line 24 provided with a check valve 24a, serves as a passage for fluid from the reservoir to the housing.

As shown in FIG. 1, the housing 14 is provided with a plurality of conduits 25, 26, 27 and 28 and a cavity forming a cylinder 29. The cylinder 29 has contained therein a slidable piston 30 having a piston rod 31 extending into the conduit 28. A pair of O rings 32 and 33 are provided for fluid tight seals between the wall structure and the piston and rod, 30 and 31, respectively.

At the one end of the cylinder 29 an adjustable stop 34 having a lock nut 35 is threadedly received in the housing 14 to contact the piston 30.

A pair of pressure lines 36 and 37 are connected from a source of pressure (not shown) into the conduits 25 and 26, respectively, and an outlet fluid line 38 serves to connect the conduit 28 with the spray device 16. Referring now to FIGS. 2 and 3 taken in conjunction with FIG. 1, the spray device 16 includes a metal block which is attached to related structure of the welding apparatus 10 by means of a pair of threaded fasteners 39 and 40 and a stud holding collet 41 extends from the nozzle 18 of the welding gun 20 through an opening in the block. A flash shield 42 of metallic material is retained in the spray device 16 by a flange, 43 in spaced relation with the collet 41. The collet 41 retains the metallic stud S adjacent the workpiece W as shown in FIG. 1, and the relationship of the flash shield 42, collet 41, stud S and workpiece W during the welding operation is similar to the relation of these elements one to the other in known prior art devices.

As particularly shown in FIG. 2, the fluid line 38 is connected to a male fitting 44, which comprises a portion of the valve 45 as will be described in greater detail hereinafter.

Figure 5:
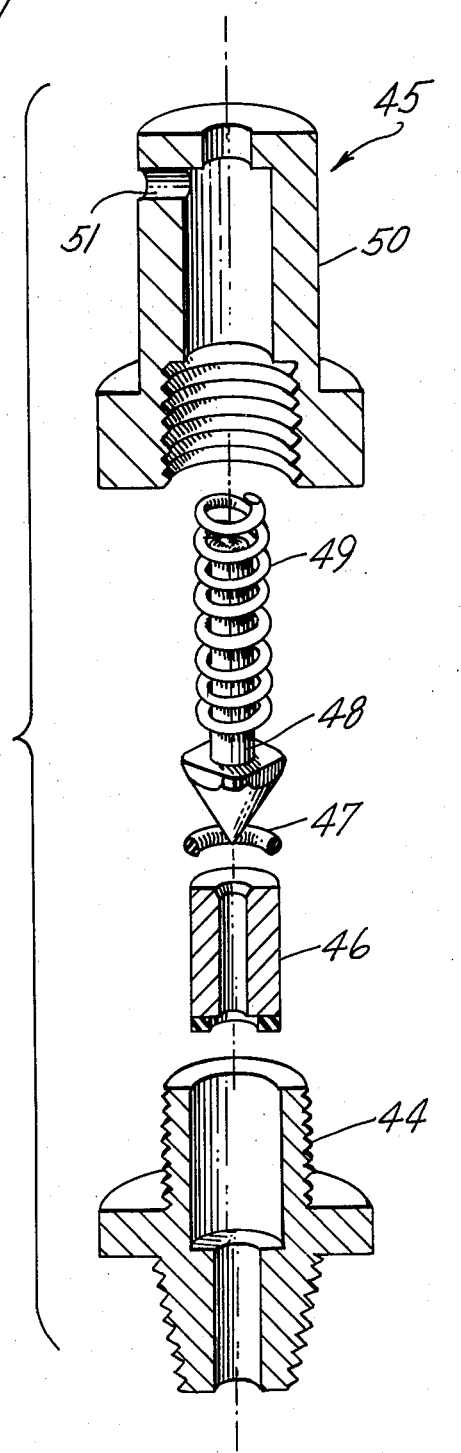
FIG. 5 is a sectional exploded view showing details of construction of a portion of the structure of FIG. 2, taken on an enlarged scale.

As shown in FIG. 5, the valve 45 in addition to the fitting 44 comprises a valve seat insert 46, and O ring seal 47, a valve stem 48 and a compression spring 49. The unit is housed in the valve body 50 having an outlet opening 51 formed therein.

Referring to FIGS. 2 and 3, the outlet opening 51 is aligned with a conduit 52 formed in the device 16 and opens into the interior of the flash shield 42. A conduit block 53 is disposed within the flash shield 42 and has a plurality of bores 54 extending therethrough parallel to the axis of the flash shield. The nozzle block 53 has a groove 55 formed adjacent the upper portion thereof which provides the annular opening into which the conduit 52 terminates.

At the lower end of the nozzle block 53 a secondary groove 56 is formed to provide an annular cavity. A plurality of bores 57 are formed at the lower portion of the block 53 and connect the annular opening formed by the groove 56 with the internal portion of the flash shield 42.

The flash shield 42, as best shown in FIGS. 3 and 4 has four semi-circular openings formed at the lower end thereof to provide four legs 58, 59, 60 and 61 to contact the work surface W. Each of the legs 58, 59, 60 and 61 has a bore 62, 63, 64 and 65, respectively formed therein which is directed from within the flash shield 42 downwardly and outwardly towards the work surface W.

In operation, the liquid reservoir 12 is supplied with a fluid which is a mixture of water and a hydrocarbon soap or other chemical mixtures designed for anti-smutting. The soap may be of any type such as a common household cleaning soap employed in the cleaning of walls, floors, etc.

With fluid contained in the reservoir 12, the valve 23 is adjusted such that a constant pressure is maintained on the reservoir which may generally be from 3 to 20 p.s.i. although a pressure of 10 to 15 p.s.i. has been found to operate to the optimum in the present system.

The pressure lines 36 and 37 are attached to a pulse valve which applies pressure at 80 to 120 p.s.i. in sequence to the lines 36 and 37. The pulse valve may be of any type well known in the art and is electrically actuated through the trigger of the welding gun prior to the welding operation taking place. Thus, as best shown in FIG. 1, when the trigger of the welding device or other means of initiating the welding process is actuated, pressure is first applied to the line 36 forcing the piston 30 forward into the conduit 28. Fluid from the reservoir 12 has entered the system in sequence. The conduit 28 and piston rod 31 are designed together with the piston 30, to create a pressure of approximately 254 to 260 p.s.i. in the system, by displacement, when the piston is actuated.

The pressure build-up through the line 38 causes the valve 45 to be opened as the valve stem 48 is moved against the spring 49, allowing the fluid to pass through the outlet opening 51. The valve 45 is designed such that it opens at approximately 45 p.s.i. and the fluid flows through the outlet opening 51 into the conduit 52 and through the bores 54 in the nozzle block 53. The bores 57 are approximately 0.010 to 0.005 inches in diameter and therefore serve to restrict the flow of fluid therethrough forming a spray nozzle effect. The fluid is therefore atomized as it flows through the bores 57.

The fluid passing into the flash shield 42 in vaporized form is partially deposited on the work surface W within the confines of the flash shield, a portion exits through the semi-circular openings at the bottom of the flash shield, and a portion is passed through the bores 62, 63, 64 and 65 to form a substantially circular film of soapy fluid which envelop the area of the work surface W surrounding the stud S and extending beyond the outer perimeter of the flash shield 42. Additional orifices 70, 72, 74 and 76 are provided in the wall of the shield 42, 90° from the location of the bores 62, 63, 64 and 65 to improve the outer perimeter coverage.

In sequence, the welding gun now is set to function in normal fashion and an electrical discharge takes place between the stud S and the work surface W after which the stud is forced into the molten material provided by the discharge to complete the welding operation. Any contaminates or smut produced by the discharge is deposited on the surface of the soapy film and may be wiped away or washed with common water, from the surface.

It will be observed that all operation of the spray device takes place prior to the ordinary welding procedure, and may be performed by any common valve and timing system constructed in accordance with the teachings of the present invention from elements as disclosed. The smut left in suspension is in the soapy deposit and is washed off by an afterwash.

In auto body construction, the afterwash does not require an additional step as it is common to preclean the material prior to phosphate or bonderizing to give the surface a body to which the paint will adhere and this precleaning bath will remove substantially all of the smut which has been held in suspension by employing the present invention.

The stop member 34 is adjustable to control the stroke of the piston 30 and thus change the quantity of fluid deposited onto the work surface W. The thickness of the deposit delivered has been found to be from 0.002 to 0.003 inches with a quantity of from 0.02 to 0.03 cc of liquid delivered at the nozzle, however, realizing that a greater thickness of material requires a substantial increase in electric power at the welding head to quench the liquid when performing the welding operation. It has been found that the quantity of 0.002 cc of liquid is optimum in the device described in that maintaining the minimum thickness of liquid does not require substantial change in the power to control the weld.

In addition to the advantages set forth above, it has been found that the liquid environment keeps weld splatter for collecting on the inside of the flash shield and collet end which is a problem common to welding guns of this type. These are items which must be replaced when splatter builds up the extent that it will cause arcing. With the employment of the present invention, splatter is almost totally prevented from collecting in that the splatter is chilled enough by the fluid but it is not at a temperature which will weld to either the collet or the splash shield.

From the foregoing therefore, it will be appreciated that the present invention provides a liquid system ously transfer such electrostatic latent image to a transfer receiving medium and obtain several tens copies.

What is claimed is:

1. A method of obtaining a number of copies transferred from one electrostatic latent image produced on an electric charge carrying member coated on an electrically conductive transfer body, comprising the steps of producing an electrostatic latent image charge on said transfer body, developing said electrostatic latent image charge into a toned picture image for each of the number of copies being transferred, applying a bias voltage between an electrically conductive screen arranged near a transfer receiving medium made in contact with the transfer body and the transfer body at the same time charging said transfer receiving medium through said electrically conductive screen with a corona source of ions so as to transfer said toned picture image produced on said transfer body to said transfer receiving medium.

2. The method according to claim 1, wherein said transfer receiving medium is delivered from a feed roll through a pair of spaced apart electrically conductive rollers arranged at the transfer position and made in contact with said transfer body.

3. The method according to claim 1, wherein said transfer receiving medium is charged through said electrically conductive screen by a flow of corona ions directed from a corona discharge device located at that side of said electrically conductive screen which is opposite to said transfer body.

* * * * *